United States Patent
Mikolajewski et al.

(10) Patent No.: US 8,973,977 B2
(45) Date of Patent: Mar. 10, 2015

(54) SHROUD ELEMENT

(71) Applicant: Dr. Ing. h.c.F. Porsche Aktiengesellschaft, Stuttgart (DE)

(72) Inventors: Sergej Mikolajewski, Remseck (DE); Stefan Schmitz, Stuttgart (DE); Corinna Kaute, Renningen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 46 days.

(21) Appl. No.: 13/898,567

(22) Filed: May 21, 2013

(65) Prior Publication Data

US 2013/0307284 A1    Nov. 21, 2013

(30) Foreign Application Priority Data

May 21, 2012 (DE) .......................... 10 2012 104 334

(51) Int. Cl.
   *B60R 13/08*    (2006.01)
   *B62D 25/12*    (2006.01)

(52) U.S. Cl.
   CPC ............ *B62D 25/12* (2013.01); *B60R 13/0838* (2013.01); *F16F 2224/025* (2013.01)
   USPC .................................... 296/191; 296/24.44

(58) Field of Classification Search
   USPC ............... 296/1.03, 39.3, 191, 193.11, 24.44; 123/198 E; 180/69.2, 69.22; 181/204
   See application file for complete search history.

(56) References Cited

U.S. PATENT DOCUMENTS

| | | | |
|---|---|---|---|
| 3,722,618 A * | 3/1973 | Butterfield et al. ............ | 181/204 |
| 6,547,301 B1 * | 4/2003 | Keller ........................... | 296/39.3 |
| 7,455,350 B2 * | 11/2008 | Bunte ....................... | 296/187.02 |
| 8,016,340 B2 * | 9/2011 | Takakura et al. ............. | 296/39.3 |
| 8,302,718 B2 * | 11/2012 | Tottori ......................... | 180/69.24 |
| 8,366,170 B2 * | 2/2013 | Glickman ..................... | 296/39.3 |
| 8,794,203 B2 * | 8/2014 | Smith .......................... | 123/90.38 |
| 8,795,807 B2 * | 8/2014 | Preisler et al. ................... | 428/99 |
| 8,808,830 B2 * | 8/2014 | Preisler et al. ................... | 428/99 |
| 8,808,833 B2 * | 8/2014 | Preisler et al. ................. | 428/116 |
| 8,808,835 B2 * | 8/2014 | Preisler et al. ................. | 428/116 |
| 2003/0154951 A1 * | 8/2003 | Nakamura et al. ......... | 123/198 E |
| 2004/0187838 A1 * | 9/2004 | Nonogaki et al. ......... | 123/198 E |
| 2005/0217634 A1 * | 10/2005 | Nonogaki et al. ......... | 123/198 E |

(Continued)

FOREIGN PATENT DOCUMENTS

| | | |
|---|---|---|
| DE | 103 14 220 | 10/2004 |
| DE | 10 2005 050 242 | 2/2007 |

(Continued)

OTHER PUBLICATIONS

German Search Report of Jan. 11, 2013.

*Primary Examiner* — Gregory Blankenship
(74) *Attorney, Agent, or Firm* — Gerald E. Hespos; Michael J. Porco; Matthew T. Hespos

(57) ABSTRACT

A shroud element, for example for the engine compartment in the rear region of the vehicle, has a lower support and a thin-walled upper cover. The cover is locally recessed in the longitudinal direction, and rubber strips are provided between the cover and the support in the region of the recesses. The rubber strips also serve as luggage stopping strips and for sound absorption. The support has U-shaped longitudinal grooves locally in formations so that different thermal expansions between the support and the cover can be compensated for.

17 Claims, 3 Drawing Sheets

(56) References Cited

U.S. PATENT DOCUMENTS

| | | | |
|---|---|---|---|
| 2006/0070599 A1* | 4/2006 | Nonogaki et al. | 123/195 C |
| 2007/0092690 A1 | 4/2007 | Gocht et al. | |
| 2007/0261661 A1* | 11/2007 | Fogolini | 123/198 E |
| 2009/0309388 A1* | 12/2009 | Ellison | 296/191 |
| 2010/0109258 A1* | 5/2010 | Smith | 277/594 |
| 2010/0127534 A1* | 5/2010 | Tottori | 296/193.11 |
| 2011/0250037 A1 | 10/2011 | Schmitz et al. | |
| 2013/0026788 A1* | 1/2013 | Kuhm et al. | 296/191 |

FOREIGN PATENT DOCUMENTS

| | | |
|---|---|---|
| DE | 603 10 795 | 11/2007 |
| DE | 10 2007 031 334 | 1/2009 |
| DE | 102011017330 | 10/2012 |
| EP | 1104726 | 6/2001 |

* cited by examiner

SHROUD ELEMENT

CROSS REFERENCE TO RELATED APPLICATIONS

This application claims priority under 35 USC 119 to German Patent Appl. No. 10 2012 104 334.5 filed on May 21, 2012, the entire disclosure of which is incorporated herein by reference.

BACKGROUND OF THE INVENTION

1. Field of the Invention

The invention relates to a shroud element for a motor vehicle.

2. Description of the Related Art

DE 603 10 795 T2 discloses a plastic sealing plate for a motor vehicle. The sealing plate is connected to a support made of sheet metal.

It is the object of the invention to provide a shroud element for a vehicle, with the shroud element acting in a vibration-damping and noise-reducing manner and being configured in a visually attractive manner without being too involved.

SUMMARY OF THE INVENTION

The invention relates to a shroud element that achieves optimum vibration absorption and sound absorption. The shroud element is substantially planar component. As used herein, substantially planar means that the extent thereof in length and width is substantially larger than the thickness thereof. This substantially planar shape is achieved by providing the shroud element with a lower support that is spanned by a thin-walled upper cover that is held on an upper side and has at least one cutout. An elastic element, preferably a rubber strip, passes through the cutout under prestress and is as it were clamped there. The clamping of the cover to the support absorbs vibrations sound between the cover and support very effectively. The cover may be made, for example, of aluminum to achieve an attractive appearance. The support preferably is manufactured from plastic.

The rubber strips may be held on longitudinal webs that protrude from the upper side of the support. The rubber strips preferably span each longitudinal web by a convexity. For this purpose, the rubber strips have limbs that are formed integrally on both sides and rest on the upper side of the support. Thus, the aluminum cover is separated from the plastic support via the rubber strips clamped therebetween so that the aluminum cover and the plastic support are decoupled from each other. This separation and decoupling also is assisted by the fact that the edge regions of each cutout are held to rest with lateral sections on the limbs of the rubber strips, and the rubber strips are arranged in the region of the convexity so as to be clamped on both sides between side edges of the cutout. Direct resting of the cover on the support is obtained by the cover being arranged at a distance from the longitudinal ribs.

The aluminum cover spans the plastic support. However, the two materials have different thermal expansion. Accordingly, the support preferably comprises U-shaped longitudinal grooves in a formation that has a downward extent from the lower side of the support, and the longitudinal grooves are open on the upper side of the support. Upright limbs of the longitudinal grooves form further longitudinal ribs on the upper side of the support. With this construction, the plastic can expand toward the longitudinal grooves so that the U-shaped longitudinal grooves compensate for different thermal expansion of the plastics support and the aluminum cover. Additionally, the grooves provide increased stability in the transverse direction of the shroud part.

The support may have a profiled element with an integrally formed fastening element for fastening the support panel or the shroud element. The fastening element may be, for example, a pin that is insertable into a receptacle on the body shell. Furthermore, support elements are arranged toward the body shell on the lower side of the support.

The shroud element extends at least over lateral domes or elements of the vehicle. More particularly, the shroud element is guided with a raised curve up to, and surrounds the domes. A free side edge of the cover of the shroud element is arranged exposed in a U-shaped groove of the plastic support and an invariable U-shaped joint is formed.

An exemplary embodiment of the invention is illustrated in the drawings and described in more detail below.

DETAILED DESCRIPTION OF THE PREFERRED EMBODIMENT

Figure 1:
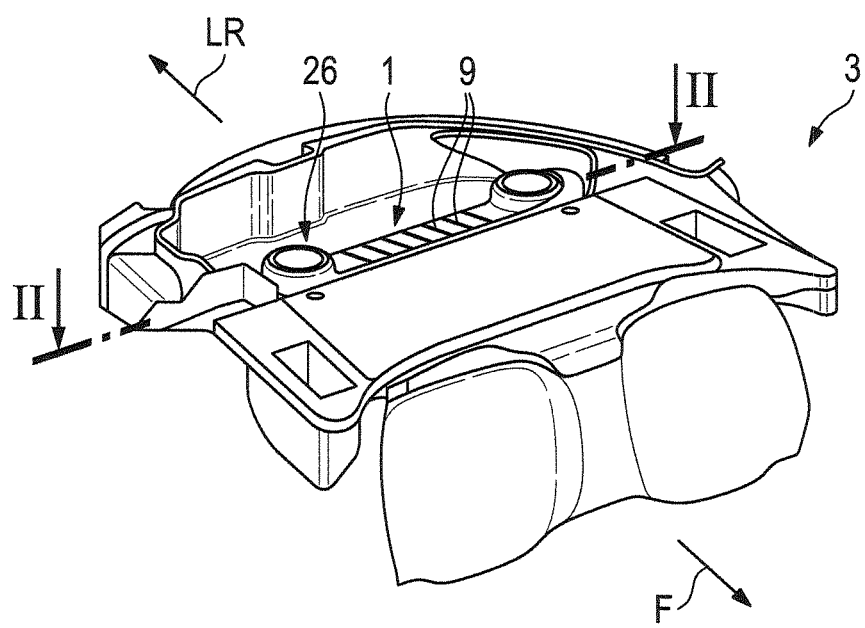
FIG. 1 is a diagrammatic illustration of a rear of a motor vehicle with an inserted shroud element.
Figure 2:
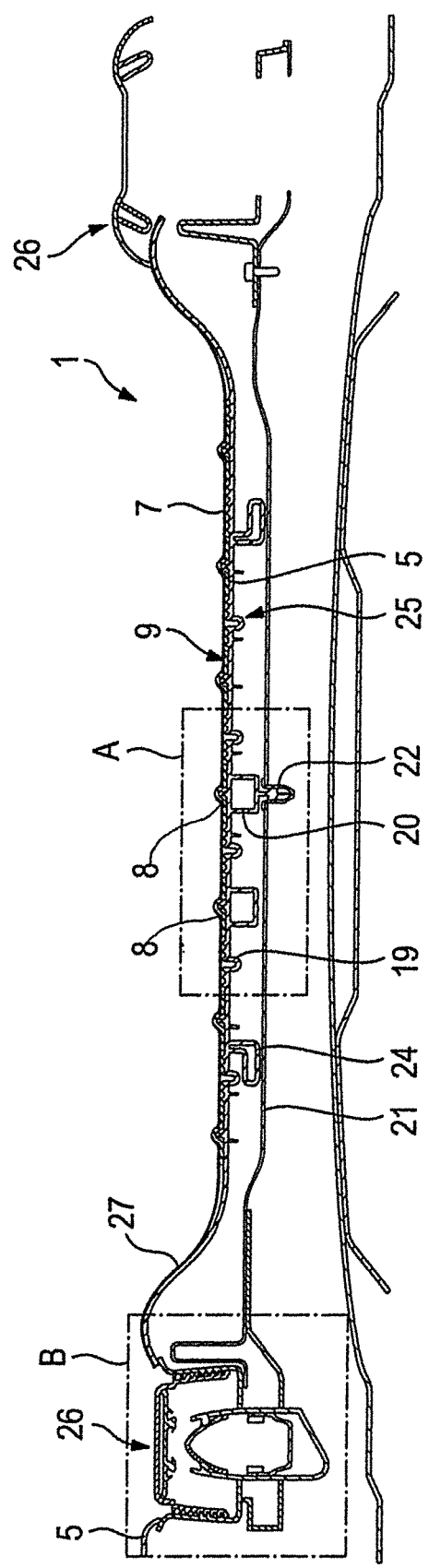
FIG. 2 is a section through the shroud element along line II-II in FIG. 1.
Figure 3:
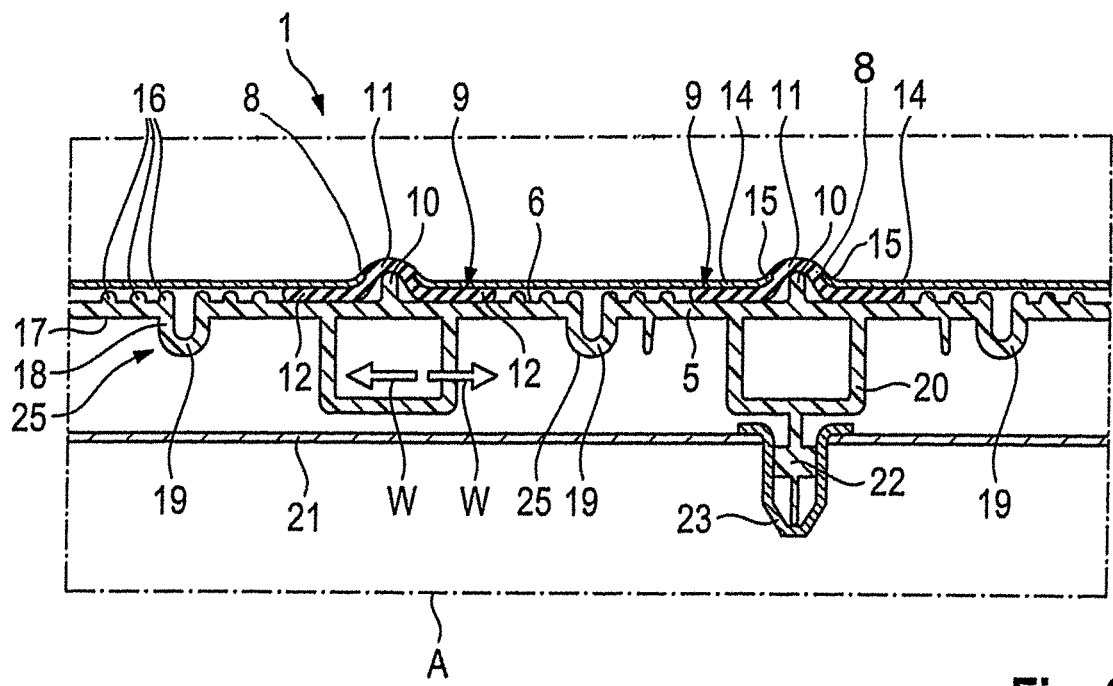
FIG. 3 is an enlarged detail A of FIG. 2 through the shroud element.

A shroud element 1 for an engine compartment of a motor vehicle 2 is arranged in the rear 3 of a vehicle and has of a panel that is held lying transversely in the vehicle. The shroud element 1 consists of a support 5 which is made of plastic and is spanned by a cover 7, which is held on the upper side 6 and is made of aluminum. The cover 7 has cutouts 8 and an elastic element, in this embodiment a rubber strip 9, is arranged through the cutouts in a clamped manner. The elastic elements extend in the longitudinal direction LR of the vehicle.

The rubber strips 9 are held on longitudinal webs 10 protruding from the upper side 6 of the support 5 and span the longitudinal webs by a convexity 11. Limbs 12 are formed integrally on the rubber strip 9 and rest on the support 5 to extend on both sides of said convexity 11. The cover 7 is held to rest with lateral sections 14 on the limbs 12 of the rubber strips 9. In addition, the rubber strips 9 are arranged in the region of the convexity 11 so as to be clamped in each case on both sides between the side edges 15 of the cutouts 8.

Spaced-apart longitudinal ribs 16 protrude integrally on the upper side 6, and the cover 7 is arranged at a vertical distance with respect to the longitudinal ribs 16. More particularly, the height of the ribs 16 is slightly smaller than the thickness of the limb 12 of the rubber strip 9, thus permitting noise-free positioning between the cover and support. The rubber strips 9 preferably form what are referred to as luggage stopping strips.

The plastic support 5 is provided, for example, with U-shaped longitudinal grooves 19, each of which is formed in a formation 25 that has a downward extent from the lower side 17. The longitudinal grooves 19 are open on the upper side and closed on the lower side. Upright limbs 18 of the longitudinal groove 19 form further upright longitudinal ribs 16 on the upper side 6 of the support 5. The longitudinal grooves 19 reinforce the support 5 in the transverse direction of the shroud part and are intended to permit thermal expansion W in the longitudinal direction of the shroud part.

A profiled element 20 is arranged on the lower side 17 of the support 5 and has an integrally formed fastening element 22 for connection to the body shell 21 of the vehicle 2. The fastening element 22 is designed to be insertable in a receptacle 23 mounted on the body shell. Furthermore, support elements 24 are provided on the lower side 17 of the support 5 and face toward the body shell 21.

Figure 4:
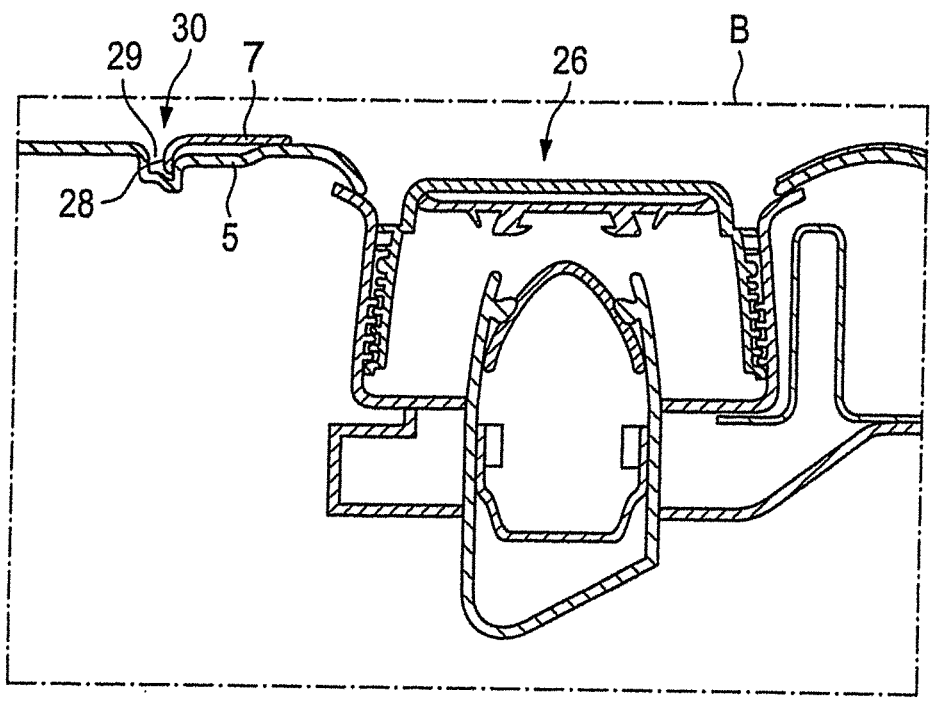
FIG. 4 is an enlarged detail B of FIG. 2 through the shroud element in the region of a dome or vehicle element.

The shroud element 1 with the cover 7 and the support 5 can extend, for example, over domes arranged at the sides of the engine compartment or over other vehicle elements. Thus, the shroud element 1 is guided with a curve 27 up to the dome 26, and a free side edge 28 of the cover 7 of the shroud element 1 is arranged exposed in, for example, a U-shaped groove 29 of the support 5 and forms a joint 30 with respect to the free sides 28 of the cover 7 (FIG. 4).

What is claimed is:

1. A shroud element for covering a structural or supporting part of a motor vehicle, the shroud element comprising:
    a support having opposite upper and lower surfaces, protrusions protruding integrally from the upper surface of the support;
    elastic elements on the upper surface of the support and covering the respective protrusions; and
    a cover spanning the upper surface of the support and at least parts of the elastic element, the cover having cutouts aligned respectively with the protrusions through which the respective elastic elements pass under prestress, thus positioning the cover in relation to the support.

2. The shroud element of claim 1, wherein the protrusions are longitudinal webs protruding from the upper surface, the elastic elements comprising a plurality of rubber strips mounted respectively over the longitudinal webs so that each of the rubber strips has a convexity spanning one of the longitudinal webs, each of the rubber strips further having limbs formed integrally on both sides of the respective convexity and resting on the upper surface of the support.

3. The shroud element of claim 2, wherein the rubber strips are luggage stopping strips.

4. The shroud element of claim 2, wherein the cover has lateral sections adjacent the cutouts, the lateral sections of the cover resting on the limbs of the rubber strips, the lateral sections of the cover defining side edges of the cutout, areas of the rubber strips at the convexity being clamped on both sides between the side edges of the respective cutouts.

5. The shroud element of claim 2, wherein the upper surface of the support has spaced-apart, protruding longitudinal ribs, the cover being opposed to the ribs and at a distance from the ribs.

6. The shroud element of claim 2, wherein the support has U-shaped longitudinal channels defining downwardly convex formations extending from the lower surface of the support and upwardly open concave grooves in the upper surface of the support, wherein the longitudinal channels include upright limbs defining longitudinal ribs projecting from the upper surface of the support.

7. The shroud element of claim 1, further comprising at least one profiled element projecting from the lower surface of the support, the profiled element being formed integrally with fastening element that is held in a receptacle on the structural or supporting part of the vehicle.

8. The shroud element of claim 1, wherein the shroud element extends at least over domes arranged at sides of an engine compartment or over other vehicle elements, the shroud element being guided with a raised curve to surround the domes or other vehicle elements, and a free edge of the cover of the shroud element being arranged in a U-shaped groove of the support to define a joint.

9. The shroud element of claim 1, wherein the support is formed from plastic.

10. The shroud element of claim 9, wherein the cover is formed from metal.

11. A shroud element for covering a structural or supporting part of a motor vehicle, the shroud element comprising:
    a support having opposite upper and lower surfaces, support elements projecting from the lower surface of the support and toward the structural or supporting part of the vehicle;
    at least one elastic element on the upper surface of the support; and
    a cover spanning the upper surface of the support and at least parts of the elastic element, the cover having at least one cutout through which the elastic element passes under prestress, thus positioning the cover in relation to the support.

12. A shroud element of for covering a structural or supporting part of a motor vehicle, the shroud element comprising:
    a support having opposite upper and lower surfaces and longitudinal webs protruding from the upper surface;
    elastic strips on the upper surface of the support and covering the respective longitudinal webs; and
    a cover spanning the upper surface of the support and resting on parts of the elastic strips, the cover having cutouts aligned respectively with the longitudinal webs and having lateral sections adjacent the cutouts, the lateral sections of the cover resting on limbs of the elastic strips laterally of the longitudinal webs, the lateral sections of the cover defining side edges of the cutouts, areas of the elastic strips that cover the longitudinal webs being clamped under prestress on both sides between side edges of the cutout, thus positioning the cover in relation to the support.

13. The shroud element of claim 12, wherein the upper surface of the support has spaced-apart, protruding longitudinal ribs, the cover being opposed to the ribs and at a distance from the ribs.

14. The shroud element of claim 12, wherein the support has U-shaped longitudinal channels defining downwardly convex formations extending from the lower surface of the support and upwardly open concave grooves in the upper surface of the support, wherein the longitudinal channels include upright limbs defining longitudinal ribs projecting from the upper surface of the support.

15. The shroud element of claim 12, further comprising at least one profiled element projecting from the lower surface of the support, the profiled element being formed integrally with a fastening element that is held in a receptacle on the structural or supporting part of the vehicle.

16. The shroud element of claim 12, wherein the support is formed from plastic.

17. The shroud element of claim 16, wherein the cover is formed from metal.

* * * * *